United States Patent [19]

Maruyama et al.

[11] Patent Number: 5,315,003
[45] Date of Patent: May 24, 1994

[54] METHOD FOR PURIFYING POLYSACCHARIDES

[75] Inventors: Kazumasa Maruyama; Kazuyuki Yamamoto; Sigehiro Nagura; Taira Homma, all of Nigata, Japan

[73] Assignee: Shin-Etsu Chemical Co., Ltd., Tokyo, Japan

[21] Appl. No.: 98,686

[22] Filed: Jul. 28, 1993

Related U.S. Application Data

[63] Continuation of Ser. No. 886,672, May 20, 1992, abandoned.

[30] Foreign Application Priority Data

May 22, 1991 [JP] Japan .................... 3-117582

[51] Int. Cl.$^5$ ............ C08B 37/00; C07H 1/06; C07H 1/08; D21C 7/06
[52] U.S. Cl. .................... 536/124; 536/127; 536/128; 127/21; 162/246
[58] Field of Search .......... 536/124, 127, 128; 127/21; 162/246

[56] References Cited

U.S. PATENT DOCUMENTS

| | | | |
|---|---|---|---|
| 3,743,539 | 7/1973 | Kroyer et al. | 127/21 |
| 4,039,373 | 8/1977 | Michelsen | 162/246 |
| 4,211,163 | 7/1980 | Brown et al. | 162/246 |
| 4,239,470 | 12/1980 | Sherman | 162/246 |
| 4,369,093 | 1/1983 | Lamort | 162/246 |
| 4,431,482 | 2/1984 | Heinbockel et al. | 162/246 |
| 4,690,788 | 9/1987 | Yada et al. | 264/130 |
| 4,831,127 | 5/1989 | Weibel | 536/128 |
| 4,833,237 | 5/1989 | Kawamura et al. | 536/124 |
| 4,895,938 | 1/1990 | Teraoka et al. | 536/128 |
| 4,944,946 | 7/1990 | Liu | 536/128 |
| 4,983,731 | 1/1991 | Wagner et al. | 536/127 |

FOREIGN PATENT DOCUMENTS

| | | |
|---|---|---|
| 0375099 | 6/1990 | European Pat. Off. |
| 1568109 | 2/1973 | Fed. Rep. of Germany |
| 48-29309 | 9/1973 | Japan |
| 58-103502 | 6/1983 | Japan |
| 2218429 | 11/1989 | United Kingdom |
| 2232993 | 1/1991 | United Kingdom |

Primary Examiner—Ronald W. Griffin
Attorney, Agent, or Firm—McAulay Fisher Nissen Goldberg & Kiel

[57] ABSTRACT

A method for continuously purifying a polysaccharide comprises the steps of continuously and simultaneously feeding an aqueous solution of a polysaccharide and a hydrophilic organic solvent which does not solubilize the polysaccharide, mixing these two kinds of liquids with a rotary turbine to precipitate the polysaccharide, cutting the precipitated polysaccharide with an interlocking cutter which comprises a fixed cutter and a rotary cutter, and continuously withdrawing a suspension of finely cut polysaccharide particles. The resulting polysaccharide is not in the form of strings, but in the form of fine particles and thus it is never adhered to an apparatus for purification and does not cause any retention within the apparatus. The particulate polysaccharides obtained by the method are easily separated from the resulting suspension and dehydrated.

9 Claims, 1 Drawing Sheet

METHOD FOR PURIFYING POLYSACCHARIDES

This is a divisional of application Ser. No. 07/886,672, filed May 20, 1992, now abandoned.

BACKGROUND OF THE INVENTION

The present invention relates to a method for purifying polysaccharides present in the form of an aqueous solution.

There have been known methods for purifying polymers present in solutions as solutes, which comprise precipitating the polymers through addition of other solvents which are miscible with the solvents for the polymer solutions, but do not solubilize the polymers to give purified polymers.

The foregoing method has been tried to apply to the purification of xanthane gum which is a polysaccharide obtained through fermentation by microorganism. According to this method, the xanthane gum is precipitated and separated by admixing the culture medium containing xanthane gum with isopropanol as a hydrophilic solvent. This method, however, requires the use of a large amount of isopropanol. Therefore, it is very troublesome to recover the isopropanol after the precipitation and separation of the xanthane gum and too much expenses must be spent upon the equipment and facilities for the treatment. Moreover, the xanthane gum is precipitated from the solution in the form of strings and if a stirring machine is used, it is difficult to perform the purification operation since the xanthane gum coils round the stirring machine.

There have been proposed various techniques for solving these problems. For instance, Japanese Examined Patent Publication (hereinafter referred to as "J. P. KOKOKU") No. Sho 54-14679 discloses a method which comprises the step of adding a dilute aqueous solution of isopropanol to a culture medium containing xanthane gum; and J. P. KOKOKU No. Hei 1-4521 discloses a method comprises adding isopropanol in portions. These methods can provide xanthane gum as precipitates which do not have a string-like shape, but require the use of a large quantity of isopropanol and this in turn makes the recovery of the isopropanol difficult.

Further, Japanese Unexamined Patent Publication (hereinafter referred to as "J. P. KOKAI") No. Hei 2-255801 discloses a method for purifying polymers present in solutions, which comprises precipitating the polymers in a mixing and stirring apparatus provided with two (i.e., upper and lower) stirring blades and simultaneously pulverizing the precipitated polymers into small masses. According to this method, however, the ability of the stirring machine to pulverize the precipitated polymers into small masses is greatly dependent upon the residence time of the polymers in the apparatus and correspondingly the processing rate is greatly limited.

SUMMARY OF THE INVENTION

The present invention has been developed for solving the foregoing problems and accordingly an object of the present invention is to provide a method for purifying a polysaccharide, by admixing, with an aqueous solution of a polysaccharide, a hydrophilic organic solvent which does not solubilize the polysaccharide to thus effectively precipitate the polysaccharide having a shape other than strings and to purify the same.

The present invention which has been developed for accomplishing the foregoing object relates to a method for continuously purify a polysaccharide which comprises the steps of continuously and simultaneously feeding an aqueous solution of a polysaccharide and a hydrophilic organic solvent which does not solubilize the polysaccharide, mixing these two kinds of liquids with a rotary turbine to precipitate the polysaccharide, cutting the precipitated polysaccharide with an interlocking cutter which comprises a fixed cutter and a rotary cutter, and continuously withdrawing a suspension of finely cut polysaccharide particles.

The purification method of the present invention can be applied to any polysaccharides so far as they are soluble in water and examples of such water-soluble polysaccharides include those derived from plants and seaweeds such as guar gum, locust bean gum, tamarind gum, tara gum, gum arabic, tragacanth gum, pectin, carrageenan and alginate, those derived from animals such as chitosan; and other polysaccharides such as dextran, xanthane gum, gellan gum, welan gum, rhamsan gum, pullulan, curdlan, schizophyllan, scleroglucan, levan, acetan, elsinan, mutan, succinoglycan, nigeran and hyaluronic acid.

Preferred hydrophilic organic solvent is isopropyl alcohol, but examples thereof further include other alcohols such as methanol and ethanol; ethers such as methyl ether and ethyl ether; dioxane, acetone and tetrahydrofuran.

The concentration of the aqueous solution of a polysaccharide preferably ranges from 0.5 to 20% by weight. This is because, if it is higher than 20% by weight, the polysaccharide precipitated is not cut into fine particles, so the purification thereof is not preferably effective, while if it is lower than 0.5% by weight, the loss in the recovery of polysaccharides becomes massive and thus is not preferable.

The mixing ratio of the aqueous solution of the polysaccharide to the hydrophilic organic solvent which does not solubilize the polysaccharide preferably ranges from 1:0.8 to 1:5 (volume/volume). This is because if the mixing ratio is less than 1:0.8, since the polysaccharide is not finely precipitated and cannot be recovered, it leads to an undesirable result, while if it exceeds 1:5, the quantity of the aqueous solution becomes superfluous, and thus is not economically preferable.

When an aqueous solution of a polysaccharide is mixed with a hydrophilic organic solvent which does not solubilize the polysaccharide, the polysaccharide is precipitated since the affinity of the organic solvent towards water is greater than the affinity thereof towards the polysaccharide. The polysaccharide precipitated is cut into fine particles by an interlocking cutter comprising a fixed cutter and a rotary cutter. The polysaccharide finely cut is uniformly distributed throughout the liquid to give a uniform suspension. The resulting polysaccharide is not string-like shape, but fine particles and thus the polysaccharide precipitated does not cause adhesion to and/or retention in the processing apparatus. Moreover, the finely pulverized polysaccharide can easily be separated from the suspension and dehydrated. Further, impurities present in the particulate polysaccharide are easily dissolved in the liquid and can easily be removed and this leads to the improvement in the purification effect of the method. The method makes it possible to continuously purify polysaccharides and thus has high industrial value.

DESCRIPTION OF THE PREFERRED EMBODIMENTS

Figure 1:
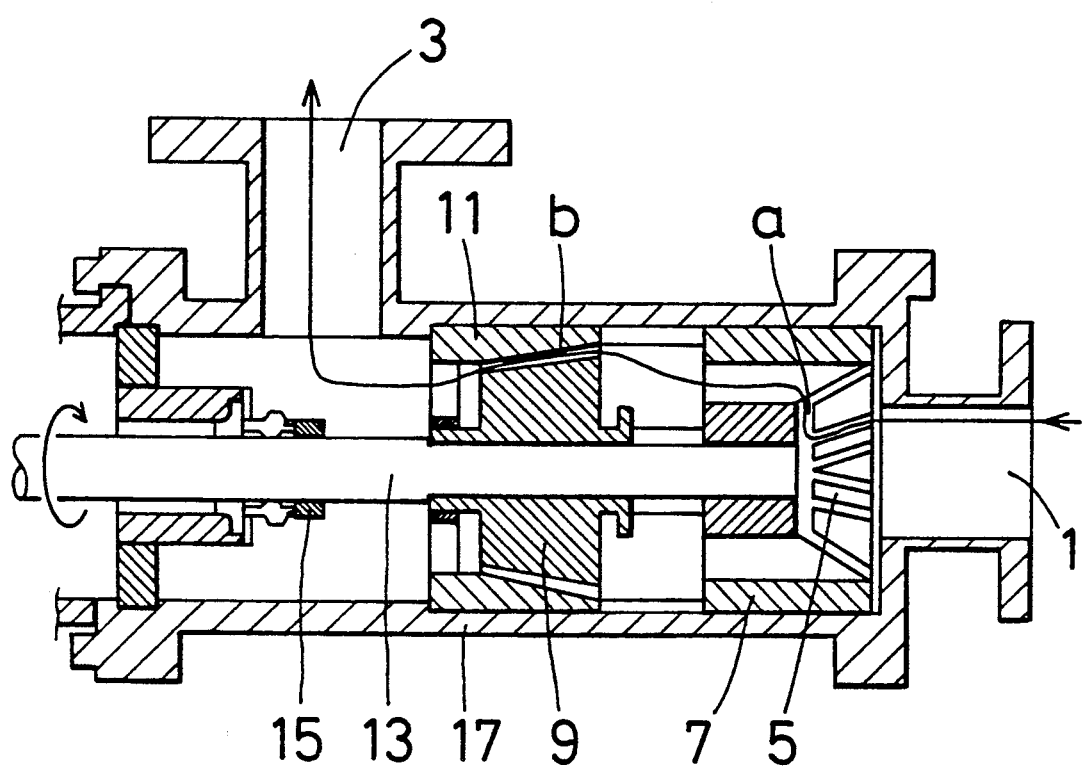
FIG. 1 is a cross sectional view showing an embodiment of an apparatus used for practicing the method for purifying a polysaccharide according to the present invention.

The method of the present invention will hereinafter be described in detail while taking embodiments by way of example, but the present invention is by no means limited to these specific embodiments.

FIG. 1 is a cross sectional view of an embodiment of a pump mill which is used in practicing the method for purifying a polysaccharide according to the present invention. The pump mill shown in FIG. 1 comprises a driving portion, a mixing portion and a cutting portion. The driving portion (not shown) consists of a motor which is connected to a turbine shaft 13 positioned outside a cylindrical casing 17 and is isolated from the interior of cylindrical casing 17 through a mechanical seal 15. The mixing portion and the cutting portion are positioned within cylindrical casing 17. Cylindrical casing 17 is equipped with an intake port 1 and a discharge port 3 and the casing is provided with turbine shaft 13 at the central portion thereof. The mixing portion comprises a rotary turbine 5 fitted to turbine shaft 13 in the vicinity of intake port 1 and a stator 7 positioned at a portion corresponding to rotary turbine 5. The cutting portion comprises an interlocking cutter which is composed of a rotary cutter 9 fitted to turbine shaft 13 between the mixing portion and discharge port 3 and fixed cutter 11 positioned adjacent to rotary cutter 9 so as to surround the rotary cutter. Rotary turbine 5 and rotary cutter 9 have spiral shapes which are tilted with respect to the axis of turbine shaft 13 so as to have a transporting ability upon the rotation of turbine shaft 13.

Spaces a and b exist between rotary turbine 5 and stator 7 and between rotary cutter and fixed cutter 11, respectively. The magnitude of these spaces in general range from 0.1 to 5 mm and preferably in the order of about 1 mm. If the space is greater than 5 mm, sufficient mixing of these two kinds of liquids are not ensured and insufficient amount of polysaccharides are precipitated. Moreover, the polysaccharides precipitated are not finely cut in the cutting portion.

A flow path is formed by interstices of each part and/or between parts within the pump mill and the liquids pass through the flow path along with a line indicated by an arrow from intake port 1 to discharge port 3.

As to the function of the pump mill, turbine shaft 13 rotates in the direction indicated by an arrow when the motor in the driving portion which in turn rotates rotary turbine 5 and rotary cutter 9. It is sufficient to set the number of revolution at a level of 1000 rpm or higher. If a solution of a polysaccharide and a hydrophilic organic solvent which does not solubilize the polysaccharide are simultaneously supplied to the pump mill through intake port 1, these two kinds of liquids are admixed by the action of rotary turbine 5. The mixed liquid is further mixed since it is compressed when it passes through space a and as a result, the polysaccharide is precipitated. The polysaccharide precipitated at this stage is in the form of a string, but it is transferred to space b of the cutting portion through space a together with the liquid and cut into fine particles by the interlocking cutter comprising rotary cutter 9 and fixed cutter 11 within the cutting portion. The particulate polysaccharides formed at space b are in the form of a mixture with the liquid and, therefore, they are discharged through discharge port 3 in the form of a suspension. The pump mill has an ability to suck and discharge the mixed liquid and these particulate polysaccharides and thus they are continuously transported from intake port 1 to discharge port 3 without causing any retention.

The method for purifying a polysaccharide according to the present invention will hereinafter be explained in more detail with reference to the following non-limitative working Examples.

EXAMPLE 1

A culture medium containing xanthane gum in a concentration of 3% by weight at a supply flow rate of 1000 l/hr. and an isopropanol solution having a water content of 15% by weight at a supply flow rate of 1500 l/hr. were simultaneously introduced into the pump mill discussed above through intake port 1 while the number of revolution of rotary turbine 5 and rotary cutter was set at 2000 rpm and space b was set at 1 mm. A suspension which was continuously discharged through discharge port 3 did not contain any string-like polysaccharide and was uniform. The suspension was further transferred to the subsequent steps for separating, dehydrating and washing to give xanthane gum particles having a high purity.

COMPARATIVE EXAMPLE 1

Using a conventional container equipped with a stirring machine as an apparatus, the culture medium containing xanthane gum used in the foregoing Example at a supply flow rate of 10 l/hr. and isopropanol at a supply flow rate of 15 l/hr. were simultaneously introduced into the apparatus while operating the stirring machine at 1000 rpm. The polysaccharide precipitated was in the form of strings which coiled round a stirring blade of the apparatus and made the purification operation difficult.

EXAMPLE 2

An aqueous solution containing locust bean gum in a concentration of 3% by weight at a supply flow rate of 1000 l/hr. and an isopropanol solution having a water content of 15% by weight at a supply flow rate of 1500 l/hr. were simultaneously and continuously introduced into a pump mill, through intake port 1, which was operated at the same number of revolution of rotary turbine 5 and rotary cutter. A suspension which was continuously discharged through discharge port 3 did not contain any string-like polysaccharide and was uniform. The suspension was further transferred to the subsequent steps for separating, dehydrating and washing to give locust bean gum particles having a high purity.

What is claimed is:

1. A method for continuously purifying a polysaccharide comprising the steps of continuously and simultaneously feeding an aqueous solution of a polysaccharide and a hydrophilic organic solvent which does not solubilize the polysaccharide, mixing these two kinds of liquids with a rotary turbine to precipitate the polysaccharide, cutting the precipitated polysaccharide with an interlocking cutter which comprises a fixed cutter and a rotary cutter, and continuously withdrawing a suspension of finely cut polysaccharide particles.

2. A method of claim 1 wherein the polysaccharide is a member selected from the group consisting of those derived from plants, seaweeds and animals or obtained through fermentation by microorganism.

3. The method of claim 2 wherein the polysaccharide is a member selected from the group consisting of guar gum, locust bean gum, tamarind gum, tara gum, gum arabic, tragacanth gum, pectin, carrageenan, alginate, chitosan, dextran, xanthane gum, gellan gum, welan gum, rhamsan gum, pullulan, curdlan, schizophyllan, scleroglucan, levan, acetan, elsinan, mutan, succinoglycan, nigeran and hyaluronic acid.

4. The method of claim 1 wherein the hydrophilic organic solvent is a member selected from the group consisting of alcohols, ethers, dioxane, acetone and tetrahydrofuran.

5. The method of claim 4 wherein the hydrophilic organic solvent is a member selected from the group consisting of isopropyl alcohol, methyl ether, ethyl ether, dioxane, acetone and tetrahydrofuran.

6. The method of claim 1 wherein the aqueous solution of the polysaccharide is a culture medium containing xanthane gum.

7. The method of claim 1 wherein the concentration of the aqueous solution of the polysaccharide ranges from 0.5 to 20% by weight.

8. The method of claim 1 wherein the volume ratio of the aqueous solution of the polysaccharide to the hydrophilic organic solvent ranges from 1:0.8 to 1:5.

9. The method of claim 1 wherein the hydrophilic organic solvent is supplied in the form of a mixture with water.

* * * * *

UNITED STATES PATENT AND TRADEMARK OFFICE
CERTIFICATE OF CORRECTION

PATENT NO. :  5,315,003
DATED     :  May 24, 1994
INVENTOR(S) :  Kazumasa Maruyama, et al It is certified that error appears in the above-identified patent and that said Letters Patent is hereby corrected as shown below:

Title Page

(3rd inventor should read as follows)

[75] Inventors:    Shigehiro Nagura

Signed and Sealed this

Twentieth Day of September, 1994

Attest:

BRUCE LEHMAN

Attesting Officer    Commissioner of Patents and Trademarks